US008699600B2

(12) United States Patent
Kuh

(10) Patent No.: US 8,699,600 B2
(45) Date of Patent: Apr. 15, 2014

(54) METHOD AND APPARATUS OF AN 8VSB SFN DISTRIBUTED TRANSLATOR SYSTEM

(75) Inventor: Steve Kuh, Chatsworth, CA (US)

(73) Assignee: K-Tech Telecommunications, Inc CA (US)

( * ) Notice: Subject to any disclaimer, the term of this patent is extended or adjusted under 35 U.S.C. 154(b) by 299 days.

(21) Appl. No.: 13/033,313

(22) Filed: Feb. 23, 2011

(65) Prior Publication Data

US 2011/0205431 A1 Aug. 25, 2011

(30) Foreign Application Priority Data

Feb. 24, 2010 (KR) ........................ 10-2010-0016517

(51) Int. Cl.
*H04L 5/12* (2006.01)

(52) U.S. Cl.
USPC ........... 375/265; 329/357; 332/170; 375/270; 375/277; 375/301; 455/47; 455/109; 455/204

(58) Field of Classification Search
None
See application file for complete search history.

(56) References Cited

U.S. PATENT DOCUMENTS

| | | | | |
|---|---|---|---|---|
| 5,418,815 | A * | 5/1995 | Ishikawa et al. | 375/216 |
| 7,110,048 | B2 * | 9/2006 | Weiss | 348/723 |
| 7,564,905 | B2 | 7/2009 | Park et al. | |
| 7,599,442 | B2 | 10/2009 | Mattsson et al. | |
| 2008/0075201 | A1 | 3/2008 | Limberg | |
| 2009/0110133 | A1 | 4/2009 | Suh et al. | |
| 2012/0176541 | A1 * | 7/2012 | Lee et al. | 348/474 |

OTHER PUBLICATIONS

Mattsson, Anders, "Single Frequency Networks in DTV." IEEE Transactions on Broadcasting, Dec. 2005, pp. 413-422, vol. 51, No. 4.
Lee, Yong-Tae, et al., "ATSC Terrestrial Digital Television Broadcasting Using Single Frequency Networks." ETRI Journal, Apr. 2004, pp. 92-100, vol. 26, No. 2.
Bretl, Wayne, et al., "ATSC RF, Modulation, and Transmission." Proceedings of the IEEE, Jan. 2006, pp. 44-59, vol. 94, No. 1.
Lee, Yong-Tae, et al., "A Design of Equalization Digital On-Channel Repeater for Single Frequency Network ATSC System." IEEE Transactions on Broadcasting, Mar. 2007, pp. 23-37, vol. 53, No. 1.

* cited by examiner

*Primary Examiner* — Adolf Dsouza
(74) *Attorney, Agent, or Firm* — Patrick Bright

(57) ABSTRACT

A frequency and data synchronization control system through the 8VSB SFN DTx modulation prevents the deterioration of the digitally broadcasted receiving sensitivity caused by a discrepancy of the frequency or data between the receiver of the digital broadcasting signal and the distributed translator or between distributed translators.

25 Claims, 7 Drawing Sheets

METHOD AND APPARATUS OF AN 8VSB SFN DISTRIBUTED TRANSLATOR SYSTEM

RELATED APPLICATIONS

This application claim priority to Korean Patent Application No. 10-2010-0016517, filed in Korea on Feb. 24, 2010, and which is incorporated herein by reference in its entirety.

FIELD OF THE INVENTION

This invention is related to the methodology and apparatus of an 8VSB distributed translation system that prevents the deterioration of the receiving sensitivity of digital television broadcasting due to transmitting the output signal on the same broadcasting channel.

DISCUSSION OF THE RELATED ART

Recently developed technology for the digital transmission system (8-VSB) of ATSC (Advanced Television System Committee) has been creating a lot of interest in the world of broadcasting. The Digital Translator (DTx) technology can improve both DTV coverage (electric field strength) and DTV service (receiving rate) by adding the synchronized multiple transmitters on the same RF channel for the entire coverage area of the broadcasting station.

The evident advantage of the DTx technology is spectrum efficiency. This is because it can use one RF channel for all the translator transmitters. To make use of this technology, the various versions of the signals appearing on the DTV receiver within the overlapping area should be made to look like delayed echoes by coinciding the carrier frequency and the data generated by all of the DTx transmitters, and by synchronizing the symbol clock frequency.

By doing so, the DTV receiver can remove small signals in the "echoes" with an equalizer (echo removal device). The best way to achieve this is, of course, is to improve the possibility of successful equalization of the DTV receiver, and by making the delays among the various transmitters in the overlapping area of the translator comparatively short.

There are various DTx technological methods. One of them uses a synchronized on-channel translator that simply relays the signals from the RF channel. Another method transmits the same transmission signal to all the distributed transmitters in another form, such as a microwave link, fiber link or other ground RF channel (different from the RF channel used by the DTx translator). This method uses the principle of a distributed converter. That is, each translator is a converter, and the output RF signal is the same and synchronized with the output of all other DTx translator outputs. The principle of synchronization is important to both methods. For its practical realization, all the requirements should be satisfied.

Regarding the RF carrier frequency (that is, the frequency that reflects the 8VSB pilot), the data, and the symbol clock, it is desirable that the carrier frequency, the data, and the symbol clock are exactly synchronized among all the translators. Thus, various versions of the time delayed and attenuated signals received by the DTV receiver can look like the static multipath Echo Distortion to the equalizer, and can be removed more easily than the dynamic multipath.

The key point is maintaining the synchronization of the carrier frequency, the data, and the symbol clock among the multiple DTx converters. Traditionally, in the case of the 8VSB DTx converter system, the coherence of the carrier frequency of the DTx converter is achieved by subjecting the local clock to the 10 MHz GPS clock, which is acquired through a GPS receiver. In the prior art, the exact match of the data is carried out by injecting the marker signal into the main 8VSB transmitter.

However, even though the GPS is, on average, correct for comparatively long hours (i.e. a whole day), there are considerable jitters, seen from the perspective of several minutes. This can deteriorate the performance of the DTx system based on the GPS clocks because the local GPS clock (10 MHz) must be updated continuously to compensate for the effect of the atmosphere while the GPS satellite passes by in the sky. Moreover, all the existing distributed translator must have a GPS receiver to lock on to the GPS clock.

Therefore, to solve the issue of the existing DTx converter, there is proposed a frequency synchronization device and the methodology that extracts the sampling timing error information and reflects it into a transmission signal during the timing restoration process of the received signal from the main transmitter or other translators, which can synchronize the RF frequencies of the output signals of the distributed translators that use the same signal as the mother signal without using an external reference signal such as a GPS receiver.

The frequency synchronization device of the distributed translator includes a timing restoration measure to compensate for the sampling timing error of the received signal, an intermediate frequency timing information reflection measure to use the sampling timing information extracted in the timing restoration measure for digital-analogue conversion, and RF timing information reflection measure to use the sampling timing information extracted in the above timing restoration measure as a reference signal for the RF up-conversion.

However, the frequency synchronization is realized by extracting the frequency error and reflecting it in a transmitted frequency. Therefore, there is no need to consider data synchronization. The reason for no data synchronization is because there is no need for Trellis decoding and encoding. Not carrying out Trellis decoding and encoding can eventually deteriorate the receiving sensitivity of the DTx.

The invention is related to DTx translation technology to solve the aforementioned issues of the existing technology, which synchronizes the transmitted carrier frequency, the data, and the clock. The carrier frequency is synchronized by using an OCXO (Oven Controlled Crystal Oscillators) clock that is synchronized with the received 8VSB symbol clock or the received clock without using GPS. Thus, the invention provides a frequency synchronization control system among the distributed translators. Once the carrier frequency is locked among the distributed translators, the clock is synchronized by simply phase-locking to a reference that is locked to the carrier frequency and the data synchronization is maintained using the method that recalculates the Trellis Encoding Memory for the 8VSB modulation or that resets the Trellis Encoding Memory periodically, while maintaining the optimum receiving sensitivity with the inclusion of the Reed-Solomon Decoding and Trellis Decoding when receiving 8VSB.

To achieve the aforementioned objective, the frequency, clock and data synchronization control system of the invented distributed translator synchronizes the output 8VSB signal using the recovered symbol clock in which the input 8VSB signal is extracted with the PLL method in the demodulator, or the output clock that is synchronized with the demodulator clock which is synchronized with the received symbol clock. Here, the frequency synchronization among the distributed translators takes place together with the synchronized clock with the phase noise minimized by the use of an OCXO. The jitters among the distributed translators are minimized and the receiving sensitivity is maximized by the Reed-Solomon Decoding and Trellis Decoding in the 8VSB demodulation. The initialization takes place in the way the Trellis Encoder Memory is calculated and input in the modulator, to feature the synchronization of the data of the distributed translators. This data initialization may also take place by periodically resetting the Trellis Encoder Memory.

The invention is related to the technology that synchronizes the transmit data clock and transmit frequency by using the OCXO clock which is synchronized with the clock that is synchronized with the receiving 8VSB symbol clock or its receiving clock without using the clock that uses the GPS receiver, in which the frequency signal and data signal of the distributed translators are synchronized by maintaining the data synchronization in the way that the Trellis Encode Memory is recalculated or reset for the realization of 8VSB modulation, while maintaining the optimum receiving sensitivity by including the Reed-Solomon Decoding and Trellis Decoding for the 8VSB receiving.

SUMMARY OF THE INVENTION

An 8VSB DTx exciter for use in an 8VSB SFN DTx converter system includes an input for receiving an 8VSB signal, an 8VSB demodulator for decoding the 8VSB input signal, and generating an input symbol clock and Transport Stream data, both extracted from the 8VSB input signal, synchronization circuitry that receives the input symbol clock and generates an output symbol clock that is synchronized with the input symbol clock, and an 8VSB modulator. The 8VSB modulator includes an input for receiving the Transport Stream data, an input for receiving the output symbol clock, and a Trellis Encoder having a Trellis memory with an initialization scheme and generating an 8VSB output signal synchronized with output symbol clock.

The synchronization circuitry in the 8VSB DTx exciter may generate an output symbol clock and the output transmit frequency signal and an RF mixer can receiving the 8VSB output signal and up-convert it with the output transmit carrier frequency signal to generate an 8VSB RF signal that is synchronized with the input symbol clock.

BRIEF DESCRIPTION OF THE ATTACHED DRAWINGS

DETAILED DESCRIPTION OF THE PREFERRED EMBODIMENTS

Figure 1:
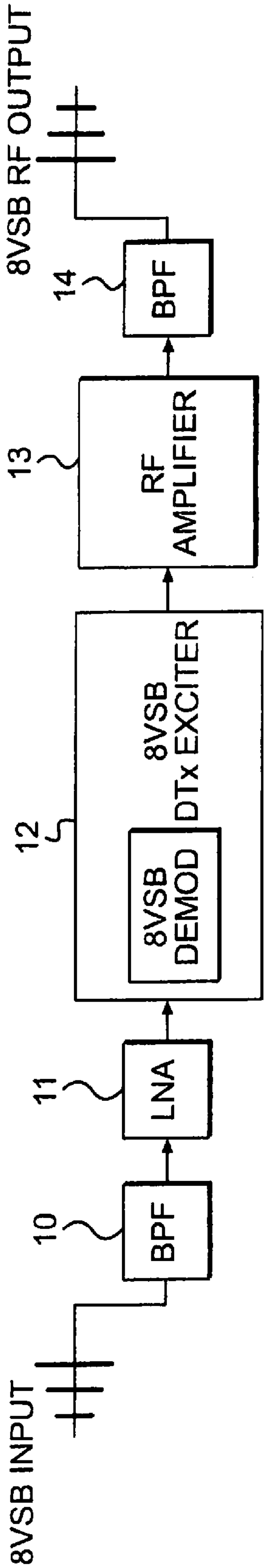
FIG. 1 is the block diagram of the 8VSB SFN DTx converter that is related to this invention.

FIG. 1 shows the system block diagram of the 8VSB SFN (single frequency broadcasting network) DTx converter that is related to the invention. As referenced here, the input signal is 8VSB RF, and is transmitted for output through BPF (Band-Pass Filter) 10, LNA (Low-Noise-Amplifier) 11, DTx Exciter 12, RF amplifier 13, and BPF 14, respectively. The DTx Exciter 12 carries out down-converting, sampling, demodulation, processing, modulating, up-converting and output. The input carrier frequency and output carrier frequency of the DTx converter are different. They use the OCXO clock that is synchronized with the input 8VSB signal, not the GPS clock, to provide a reference clock to the DTx Exciter. All the output system clocks are calculated from the 8VSB signal.

Figure 2:
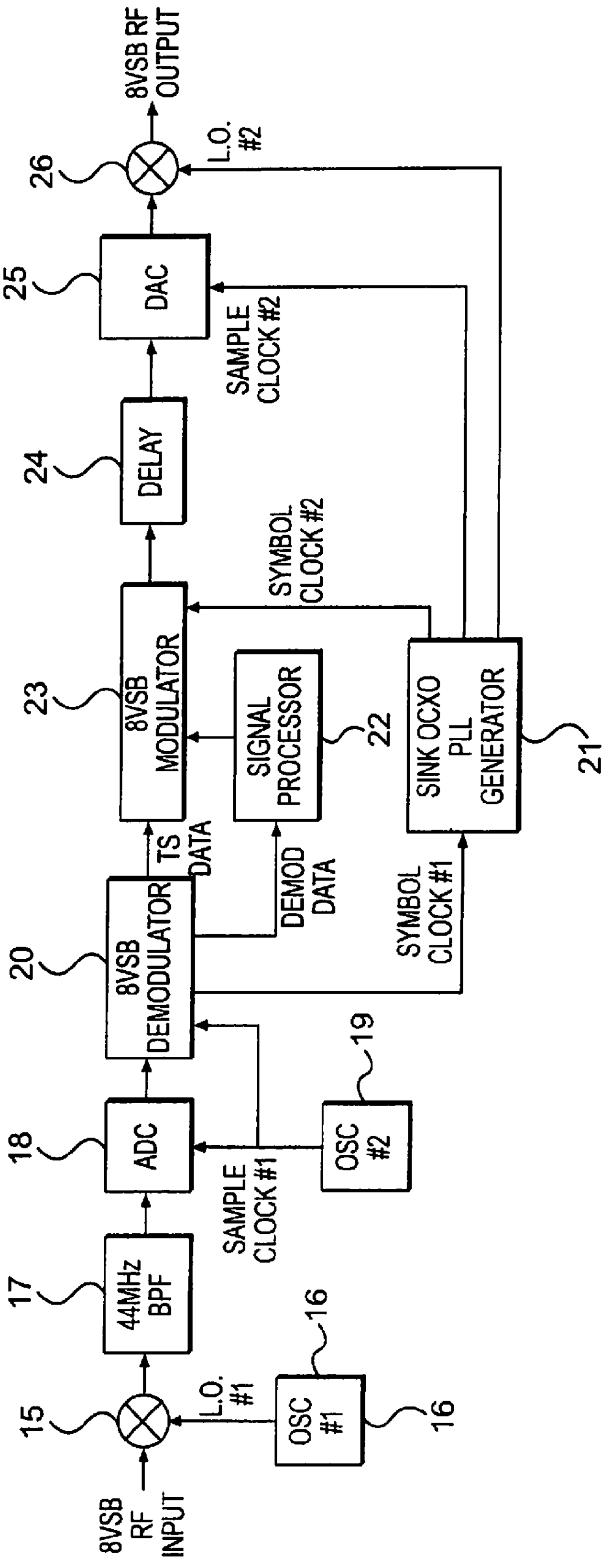
FIG. 2 is the detailed block diagram of the 8VSB SFN DTx Exciter that is related to the invention.

FIG. 2 is the detailed structure of the 8VSB SFN DTx Exciter that is related to the invention. All the transmit clocks are generated and used based on the phase locked clocks which are subject to the demodulated 8VSB symbol clock, instead of the existing GPS. Using other equal clocks that are phase locked to the demodulated 8VSB symbol clock, such as the demodulated Transport Stream clock, Reed-Solomon, and Field Sync Clock produces equal performance. First, the 8VSB RF signal that is input to the DTx Exciter 12 is mixed in the mixer 15 by the oscillation frequency 16. The frequency is modulated and is input to ADC 18 through the BPF 17 at 44 MHz. The signal that is input to the ADC 18 is sampled by OSC 19 and changes to a digital value, and is transmitted to the 8VSB demodulator 20.

In the 8VSB demodulator 20, complete 8VSB demodulation takes place, which includes the Reed-Solomon Error Correction Decoding and Trellis Decoding. This takes place due to the error correction capability of the Reed-Solomon Decoding and Trellis Decoding. The content of the Trellis Encoder is controlled with the memory initialization algorithm. The decoded signal is modulated again in the 8VSB modulator 23 that uses ATSC A53 8VSB modulation standards. The demodulation output Transport Stream data of the above 8VSB demodulator 20 sets the frequency offset to the 8VSB modulator 23 in the signal processor 23 on the condition of a frequency fix by the symbol clock that is generated in the OCXO PLL generator 21. The modulation signal that is output from the 8VSB modulator goes through a delay 24, changes into an analogue again in the DAC 25, is mixed as a local frequency signal in the mixer, and is output as the 8VSB RF. The delay 24 on the output terminal of the 8VSB modulator makes the system control possible in the early setup period by providing various time delays and allows signal time delays to the output of the DTx converter. The time delay value of the delay 24 can be set up according to system requirements of the signal overlapping area that is to be suggested as a minimum multi-phase signal distortion (for example, a short signal echo delay easily within the consumer product equalizer delay ranges).

Because all the DTx transmit signals are locked by the frequency and symbol clock at the main 8VSB signal, the Set-Top-Box (STB) set of the receiving 8VSB consumer or the digital television (DTV) set are considered to treat the signal from other DTx converters to be a distorted multi-phase signal. Therefore, the system delay parameter can be set up based on the expected overlapping area for the geographical position of the DTx converter and minimum signal multi-phase distortion. The system requires the initialization method of the Trellis Encoder Memory together with the delay parameter of the DTx converter.

Figure 3:
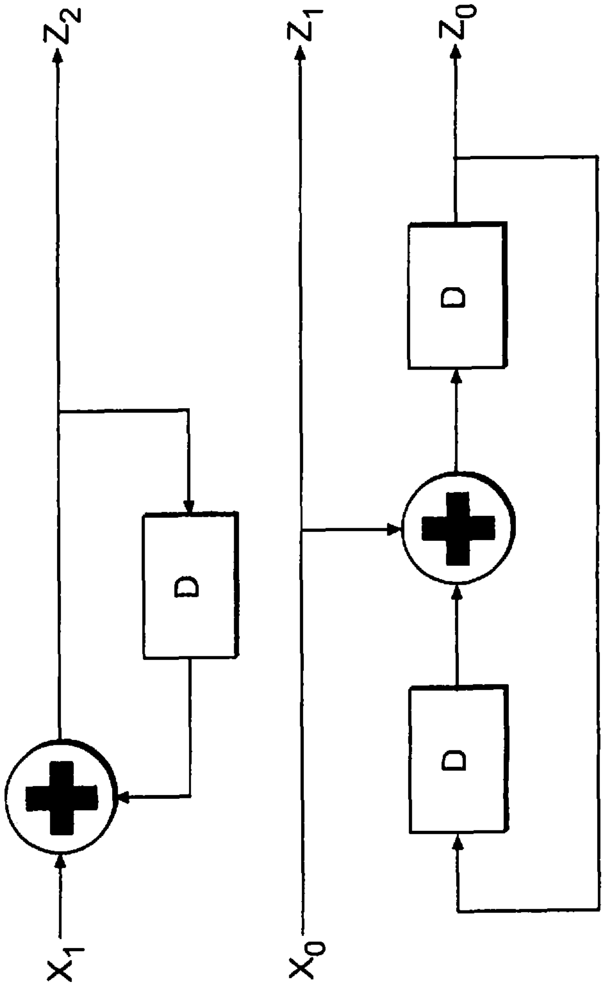
FIG. 3 is the process description of the memory initialization of the Trellis Encoder that is related to the invention.

FIG. 3 explains the initialization process of the Trellis Encoder Memory that is related to the invention. Here, because of the endless memory characteristics of the Trellis Encoder, re-initialization is important at the 8VSB modulator 23 as a method of synchronization of the memory condition of the internal Trellis Encoder of the DTx converter. This is important because the individual DTx converter can start at different times because of a power outage or manual reset of the DTx translator operator.

There are various ways to initialize the Trellis Encoder Memory. One of them is to reset the Trellis Encoder Memory to a certain time interval (for example, all the frames at 48.4 milliseconds) at a known fixed value. It is reported that a bit of dB SNR loss can occur due to such a simple memory reset technology. Such a known fixed condition value can be all zeros, all ones or other certain values. Even though the method is simple, a packet error will occur in the receiver whenever the Trellis Encoder Memory is reset. Although we can expect such errors to be corrected by the error correction mechanism built into the 8VSB STBDJP of the receiving customer, resetting to the cyclical, known fixed value can cause a beat error rate decrease.

Another method of re-initializing the Trellis Encoder Memory of the 8VSB modulator 23 in the DTx Exciter is to recalculate the content of the Trellis Encoder based on the incoming demodulated data. The content of the Trellis Encoder Memory can be recalculated by randomizing, interleaving, and Trellis encoding, which is specified in the ATSC A53 standard with the use of received Transport Stream Data without any packet corrections, such as packet insertion or removal, finding the exact data from the 8VSB demodulator without packet insertion or removal.

All the symbols are formulated in the same way in the DTx converter. Therefore, all the 8VSB data symbols are exactly matched. The appropriate frame signal is acquired from the 8VSB demodulator as a reference frame time signal for the 8VSB modulator in the DTx Exciter. In this case, the frame synchronization signal that was recovered from the 8VSB demodulator is used. This can also be used as another appropriate frame signal, such as the RS clock that is recovered from the 8VSB demodulator or the recovered interleave clock.

The invention does not use a GPS related clock for the synchronization of the transmit carrier frequency in the DTx converter. All the transmit clocks used in the invention are generated based on the phase lock OCXO, which is subject to the phase lock clock, such as the recovery 8VSB symbol clock or its equivalent demodulator transmission strip clock, that is, based on the OCXO PLL generator 21. A common reference which is based on the GPS becomes unnecessary because all the DTx modulators are phase locked to the main 8VSB transmit signal. Neither the signal processes, which extract the frequency error and reflect it to the transmit frequency, nor the carrier frequency error extraction and supplementation, become necessary.

Figure 4:
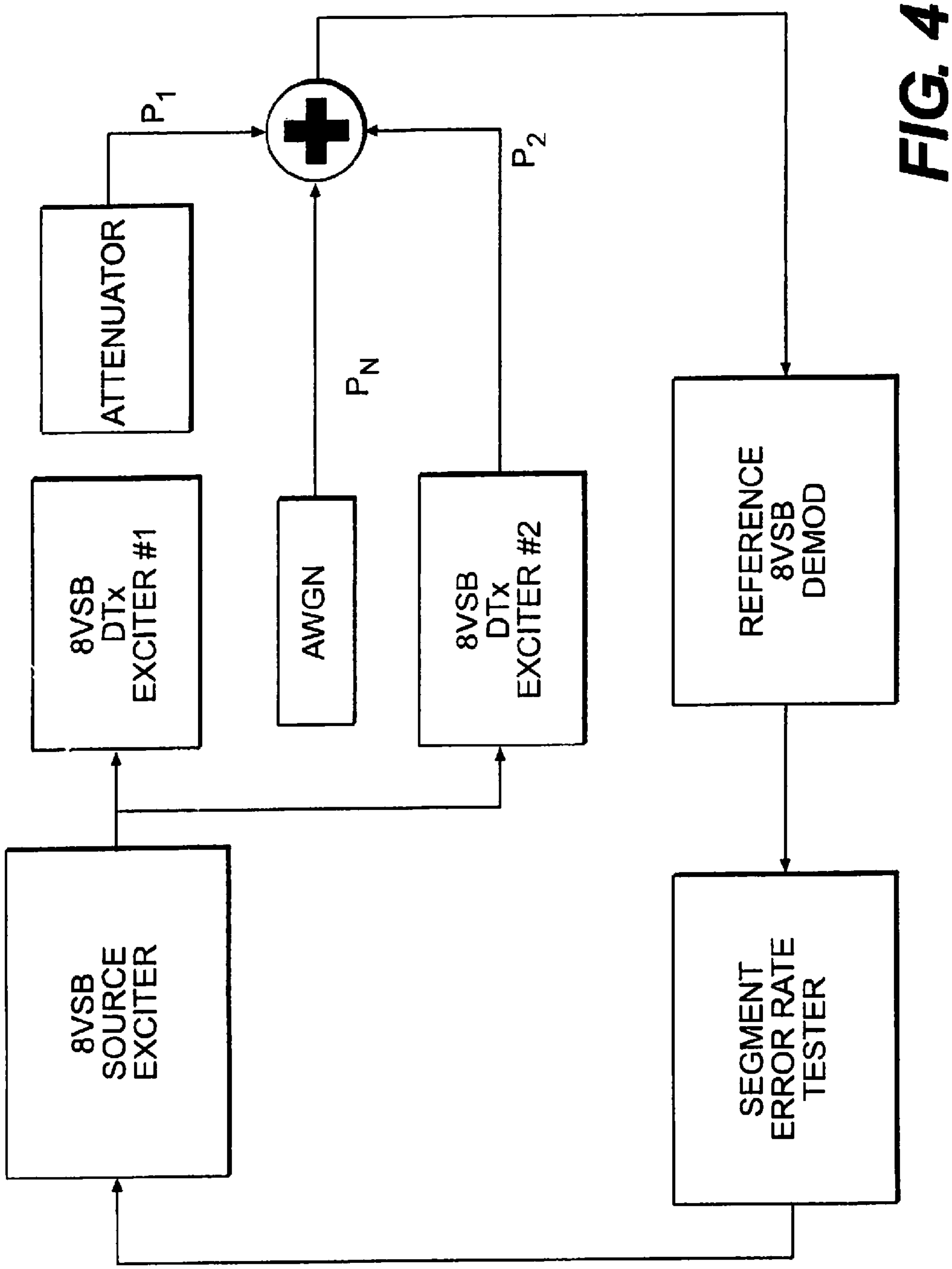
FIG. 4 is the structure of the hardware of the test device used for testing the performance of the invention.

FIG. 4 is a diagram of the hardware of the test device for the measurement of the performance of the invention system. Here, the SER (Segment Error Rate) is used as the performance value. The average segment error rate is measured for all the SER points in minutes. An 8VSB demodulator IC is used in the demodulator to find all the SER resultant values with the reference 8VSB demodulator. The reference 8VSB demodulator block includes the BPF, LNA and RF tuner on its front end.

The test hardware can reflect the varying power ratios of the DTx Exciters by adapting the RF attenuator to the output of the DTx Exciter #1. The signal power output from the DTx Exciter #1 and the Exciter #2 are indicated as P1 and P2, respectively. The time delay between DTx#1 and #2 also changes.

The SNR is defined as PS/PN. The PS is measured for signal power combined with P1 and P2 for the 6 MHz synchronization noise bandwidth, and the PN is measured for the AWGN (Additive White Gaussian Noise) signal across the 6 MHz synchronization noise. In the case of the DTx converter system, the SER performance is found to be very sensitive to the symbol clock phase noise in the 8VSB Source Exciter.

Figure 5:
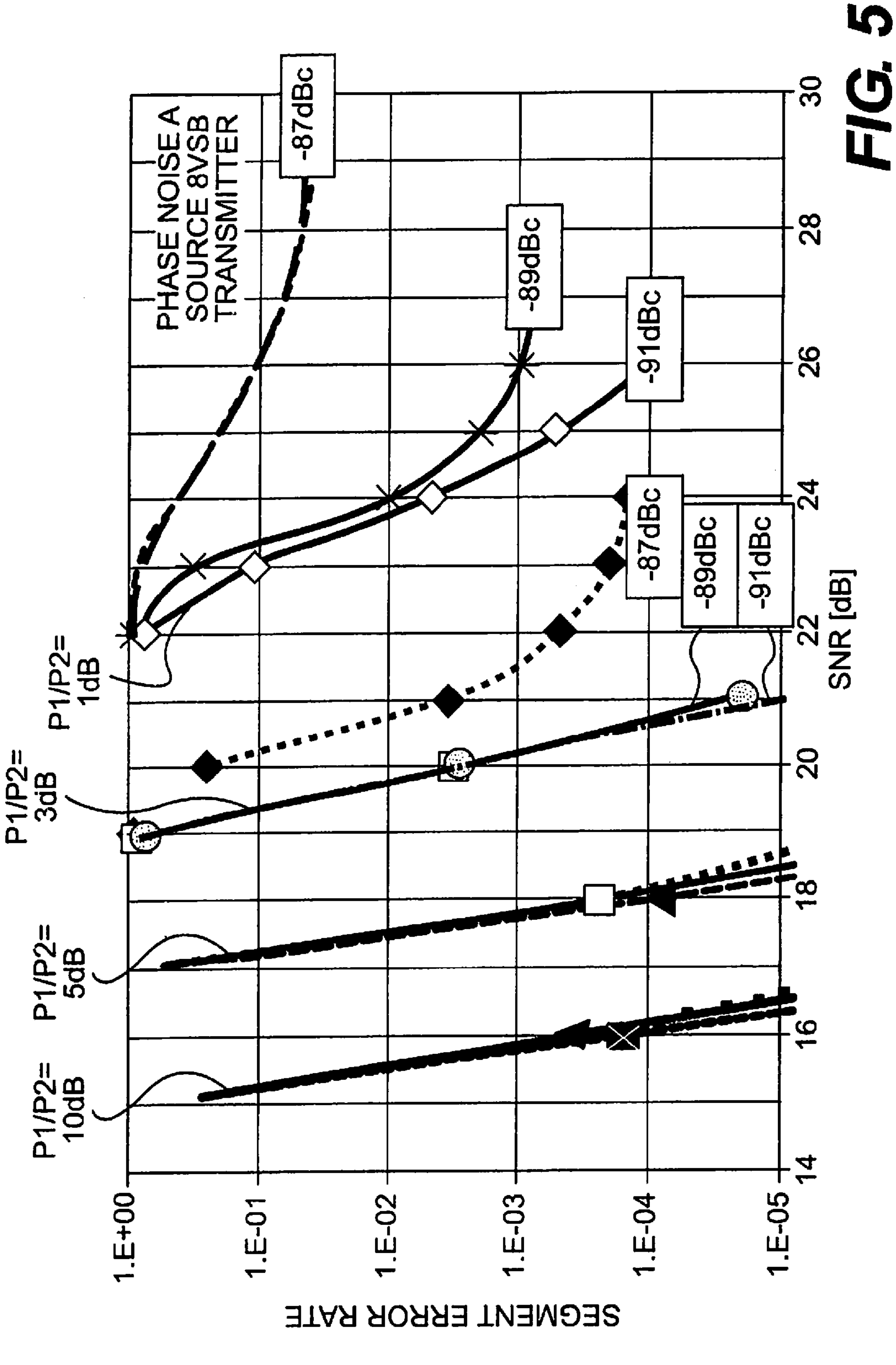
FIG. 5 is the graph of the performance result which reflects the pattern of the change of the segment error rate with the increase of the main transmit jitter clock.

FIG. 5 shows the characteristics of the source symbol clock phase noise at a 10 KHz offset for each case of −87 dBc, −89 dBc and −91 dBc.

The aforementioned phase noise is measured at an 86.0979 MHz clock that runs at 8 times the symbol rate in the 8VSB Source Exciter. According to the SER result of Drawing 5, higher SNR is required for the given SER as the power gap becomes closer between the DTx #1 and #2. That is, the synchronization noise attributable to the multi-phase becomes stronger for the receiver as the two synchronized signals become closer to each other, as seen from the signal level perspective.

Also according to FIG. 5, regarding the 1E-4 SER, the two DTx signals in the DTx signal overlapping area require an additional 10 dB of signal power level when the receiving signal power gap between DTx#1 and DTx#2 arrives at 1 dB together with the time delay of 1 μs, compared with when the receiving signal power gap between DTx #1 and #2 becomes 10 dB.

When the signal coverage of the DTx converter is overlapping, it is possible that neighboring DTx signals can be received. Typically, the worst case is when the received signal power from DTx#1 becomes equal to the signal power received from DTx #2. According to the 8VSB SFN DTx converter technology, the 8VSB signal coverage overlapping becomes possible with a minimum DTx power ratio of 0 dB, depending on the performance of the OCXO.

According to the SER findings of FIG. 5, it can be seen that the SER performance deteriorates as the clock jitter becomes bigger at the main source 8VSB. The SER change becomes smoother for all the P1/P2 at 87 dBc source symbol clock phase noise as the SNR increases. This indicates that the source 8VSB symbol clock jitter becomes the determining factor of the SER performance in the DTx converter system. Considering that the SMPTE-310M, which is the clock jitter specification in the ATSC 8VSB transmission system that defines the 19.39 Mbps transport strip clock jitter, this specification should be reviewed for the application of the DTx converter.

Figure 6:
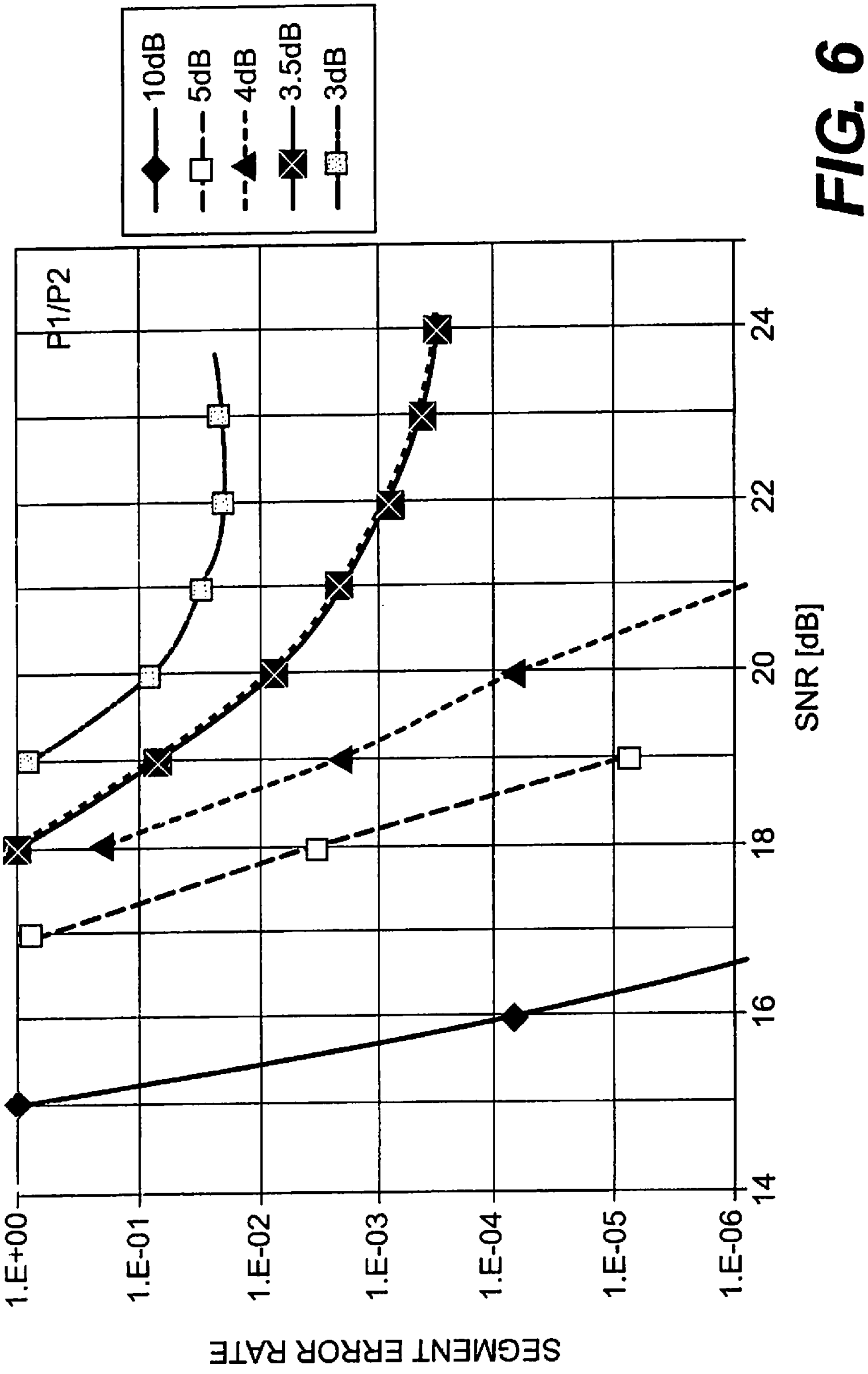
FIG. 6 is the graph of the change of the segment error rate of the DTx converter which uses the GPS clock.

FIG. 6 describes the SER performance of the DTx converter when the system is locked to the GPS 10 MHZ source phase. Here, the 10 MHz clock, which is calculated from two GPS (Trimble Thunderbolt E GPS Disciplined Clocks), is used for the synchronization of the two DTx converters. One GPS antenna is located on opposite sides of the building. This is to make certain that each of the two GPS receivers faces toward a different set of GPS satellites. The clock jitter that is the 8VSB transmit clock phase noise does not appear. As it appears in FIG. 6, to use the GPS clock as a means of subjecting multiple DTx converters is fine when the DTx receiving power ratio is more than 4 dB, but the SER performance considerably deteriorates when the ratio is below 4 dB. This is because the satellite is assumed to continuously update the GPS 10 MHz reference clock as the satellite moves through the sky due to atmospheric effects. Such clock updates occur every hour so they can generate clock jitters which deteriorate the performance when used on the DTx converter system. Because of that, a GPS system based on a DTx converter provides a very small overlapping signal coverage area in the SFN 8VSB distributed translator system.

Figure 7:
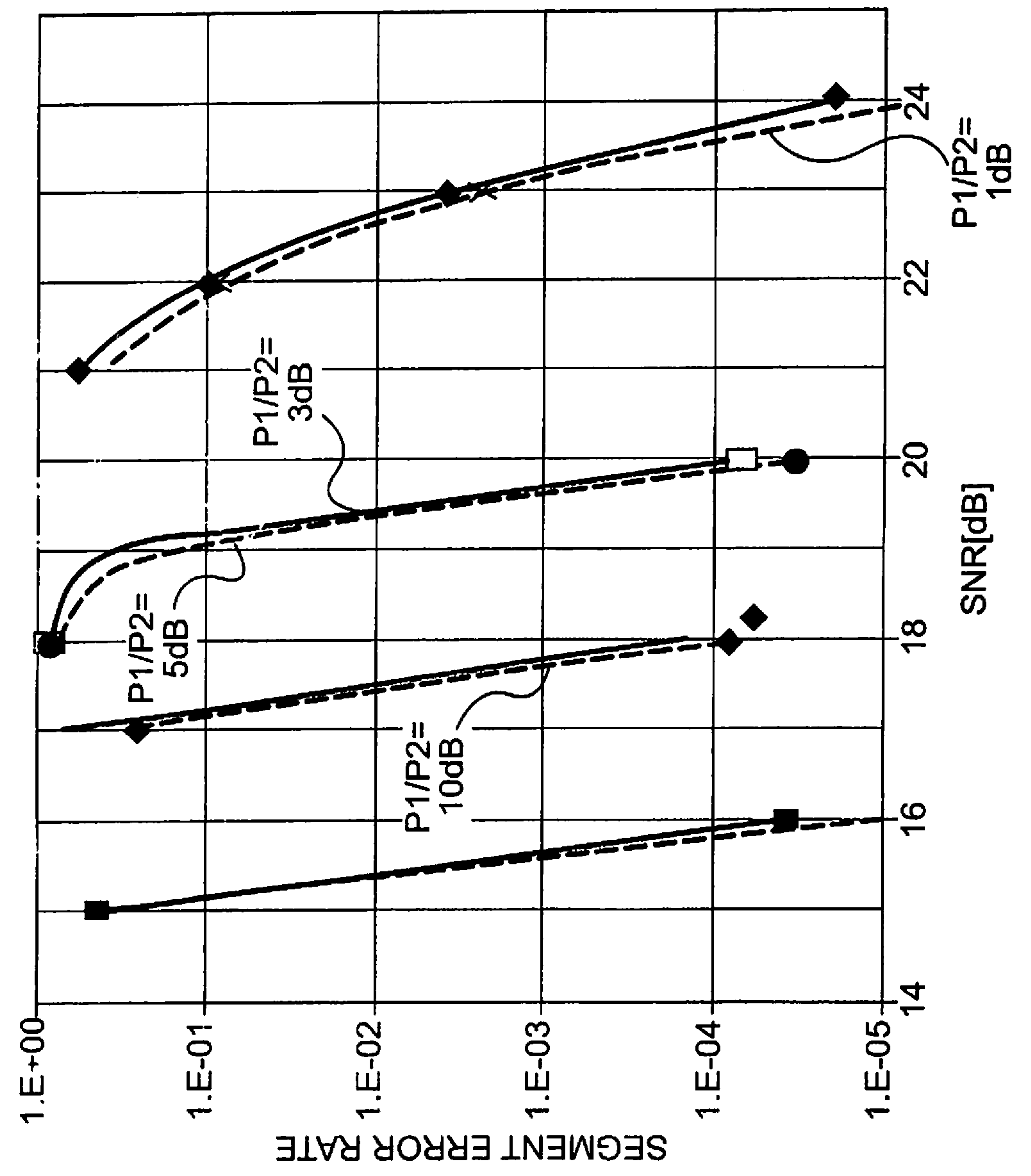
FIG. 7 is the graph of the segment error rate with the SNR being the factor when the Trellis Encoder Memory is reset or recalculated (no reset) while the time delay between the two DTx systems is 1 μs.

FIG. 7 shows the Segment Error Rates for the SNR factor either when the Trellis Encoder Memory is reset or when it is not reset (no reset) in both cases of which two DTx systems are used and the time delay between the two DTx system is 1 μs. Here the dotted line is for the "no reset" case and the solid line is for the reset case. In the case of no reset, it shows an SNR improvement of 0.1~0.2 dB.

As explained already, the 8VSB SFN DTx Translator System of the invention can synchronize the frequency signal and data signal of the distributed translators while maintaining the optimum receiving sensitivity through the assumed combination of the OCXO phase lock clock that is synchronized with the recovered 8VSB symbol clock and the Trellis Encoder Memory in the DTx Translator Exciter.

What is claimed is:

1. An 8VSB DTx exciter for use in an 8VSB SFN DTx converter system comprising:
- an 8VSB demodulator configured to decode an 8VSB input signal, and to generate an input symbol clock and Transport Stream data, both extracted from the 8VSB input signal;
- synchronization circuitry including a phase locked phase noise minimizing crystal oscillator clock that receives the input symbol clock and generates an output carrier transmit frequency signal, and configured to receive the input symbol clock and generate an output symbol clock that is synchronized with the input symbol clock;
- an 8VSB modulator, comprising:
  - a first input configured to receive the Transport Stream data,
  - a second input configured to receive the output clock, and
  - a Trellis Encoder having a Trellis memory with an initialization scheme and configured to generate an 8VSB output signal synchronized with the output symbol clock.

2. The 8VSB DTx exciter of claim 1, further comprising a delay circuit to delay the 8VSB output signal.

3. The 8VSB DTx exciter of claim 1, configured to initialize the Trellis memory with fixed values of either 0, 1, or selected fixed values.

4. The 8VSB DTx exciter of claim 1, configured to initialize the Trellis memory based on incoming demodulated data in the Transport Stream data.

5. The 8VSB DTx exciter of claim 1, configured to recalculate the content of the Trellis memory by the process of randomization, interleaving and Trellis encoding which are specified to the ATSC A53 standard using the Transport Stream data, and without any packet modification.

6. The 8VSB DTx exciter of claim 1, wherein the 8VSB demodulator includes a Trellis Decoder and a Reed-Solomon Decoder.

7. The exciter of claim 1 wherein said phase noise minimizing clock is an OCXO.

8. An 8VSB DTx exciter for use in a synchronized 8VSB digital translator system, comprising:
- An 8VSB demodulator configured to decode an 8VSB input signal, and to generate an input clock and Transport Stream data, both extracted from the 8VSB input signal;
- synchronization circuitry, including a phase locked phase noise minimizing crystal oscillator clock that receives the input symbol clock and generates an output carrier transmit frequency signal, and configured to receive the input symbol clock and generate an output symbol clock that is synchronized with the input symbol clock;
- an 8VSB modulator, comprising:
  - a first input configured to receive the Transport Stream Data,
  - a second input configured to receive the output symbol clock, and
  - an output configured to generate an 8VSB output signal synchronized with the output symbol clock.

9. The 8VSB DTx exciter of claim 8, further comprising a delay circuit to delay the 8VSB output signal.

10. The 8VSB DTx exciter of claim 8, wherein the 8VSB modulator comprises a Trellis Encoder having a Trellis memory with an initialization scheme.

11. The 8VSB DTx exciter of claim 10, configured to initialize the Trellis memory with fixed values of either 0, 1, or selected fixed values.

12. The 8VSB DTx exciter of claim 10, configured to initialize the Trellis memory based on incoming demodulated data in the Transport Stream data.

13. The 8VSB DTx exciter of claim 10, configured to recalculate the content of the Trellis memory by the process of randomization, interleaving and Trellis encoding which are specified to the ATSC A53 standard using the Transport Stream data, and without any packet modification.

14. The 8VSB DTx exciter of claim 8, wherein the 8VSB demodulator includes a Trellis Decoder and a Reed-Solomon Decoder.

15. The exciter of claim 8 wherein said phase noise minimizing clock is an OCXO.

16. An 8VSB DTx exciter for use in a synchronized 8VSB digital translator system, comprising:
- an 8VSB demodulator including a Trellis Decoder and a Reed-Solomon Decoder, the 8VSB demodulator configured to decode an 8VSB input signal, and to generate an input symbol clock and Transport Stream Data, both extracted from the 8VSB input signal;
- synchronization circuitry including a phase locked phase noise minimizing crystal oscillator clock, configured to receive the input symbol clock, generate an output symbol clock that is synchronized with the input symbol clock, and generate an output transmit carrier frequency signal;
- an 8VSB modulator, comprising:
  - a first input configured to receive the Transport Stream data,
  - a second input configured to receive the output symbol clock,
  - a Trellis Encoder having a Trellis memory with an initialization scheme and configured to generate an 8VSB output signal synchronized with the output symbol clock; and
- a delay circuit to delay the 8VSB output signal.

17. The exciter of claim 16 wherein said phase noise minimizing clock is an OCXO.

18. An 8VSB DTx exciter for use in an 8VSB SFN DTx converter system comprising:
- an 8VSB demodulator configured to decode an 8VSB input signal, and to generate an input symbol clock and transport stream data, both extracted from the 8VSB input signal;
- synchronization circuitry including a phase locked phase noise minimizing crystal oscillator clock, and configured to receive the input symbol clock and generates an output carrier transmit frequency signal, said synchronization circuitry configured to receive the input symbol clock and generate an output symbol clock that is synchronized with the input symbol clock;
- an 8VSB modulator, comprising:
  - a first input configured to receive the Transport Stream data, a second input configured to receive the output clock, and a Trellis Encoder having a Trellis memory with an initialization scheme and configured to generate an 8VSB output signal synchronized with the output symbol clock.

19. The exciter of claim 18 wherein said phase noise minimizing clock is an OCXO.

20. An 8VSB DTx exciter for use in an 8VSB SFN DTx converter system comprising:

an 8VSB demodulator configured to decode an 8VSB input signal, and to generate an input symbol clock and Transport Stream data, both extracted from the 8VSB input signal;

synchronization circuitry a phase locked phase noise minimizing crystal oscillator clock configured to receive the input symbol clock and generate an output symbol clock that is synchronized with the input symbol clock;

an 8VSB modulator, comprising:

a first input configured to receive the Transport Stream data, a second input configured to receive the output clock, and a Trellis Encoder having a Trellis memory with an initialization scheme, configured to initialize the Trellis memory at selected fixed time intervals and to generate an 8VSB output signal synchronized with the output symbol clock.

21. The exciter of claim 20 wherein said phase noise minimizing clock is an OCXO.

22. An 8VSB DTx exciter for use in a synchronized 8VSB digital translator system, comprising:

an 8VSB demodulator configured to decode an 8VSB input signal, and to generate an input clock and transport stream data, both extracted from the 8VSB input signal;

synchronization circuitry, including a phase locked phase noise minimizing crystal oscillator clock, configured to receive the input symbol clock and generates an output carrier transmit frequency signal, and configured to receive the input symbol clock and generate an output symbol clock that is synchronized with the input symbol clock;

an 8VSB modulator, comprising:

a first input configured to receive the Transport Stream Data, a second input configured to receive the output symbol clock, and an output configured to generate an 8VSB output signal synchronized with the output symbol clock.

23. The exciter of claim 22 wherein said phase noise minimizing clock is an OCXO.

24. An 8VSB DTx exciter for use in a synchronized 8VSB digital translator system, comprising:

an 8VSB demodulator configured to decode an 8VSB input signal, and to generate an input clock and transport stream data, both extracted from the 8VSB input signal;

synchronization circuitry including a phased locked phase noise minimizing crystal oscillator clock configured to receive the input symbol clock and generate an output symbol clock that is synchronized with the input symbol clock;

an 8VSB modulator, comprising:

a first input configured to receive the Transport Stream Data, a second input configured to receive the output symbol clock, and an output configured to initialize the Trellis memory at selected fixed time intervals and to generate an 8VSB output signal synchronized with the output symbol clock.

25. The exciter of claim 24 wherein said phase noise minimizing clock is an OCXO.

* * * * *